Sept. 19, 1933.  J. P. RICHARDSON  1,927,470
ANIMAL TRAP
Filed Oct. 12, 1932

J. P. Richardson
INVENTOR.

BY Elmer Stewart
ATTORNEY

Patented Sept. 19, 1933

1,927,470

UNITED STATES PATENT OFFICE 1,927,470

ANIMAL TRAP

Joseph Paul Richardson, Catlettsburg, Ky.

Application October 12, 1932. Serial No. 637,530

3 Claims. (Cl. 43—81)

This invention deals with improvements in animal traps. I have observed that small rodents such as rats and mice have the habit of seizing their food with a lifting motion preliminary to eating it. In many instances they can thus remove bait without springing the trap, where the latter depends upon a downward movement of the bait-holder in order to release the jaw of the trap. My invention aims to provide an arrangement on the trap by which the release of the jaw is caused by raising or lifting the bait holder rather than pushing it downward.

Another object of my invention is to remove the releasing means to a point inwardly of the pivot of the trip device for better safety of the one placing the trap. It follows from the design of my improvement that the position of the release and the fact that the trap is not sprung when the bait-holder is pressed down insures against premature release of the trap while it is being set or put in position.

Another object of my invention is to simplify the design and strengthen the form of the jaw of the trap.

In order to emphasize the features of my invention, I have shown the preferred form in the accompanying drawing in which.

Figure 1:
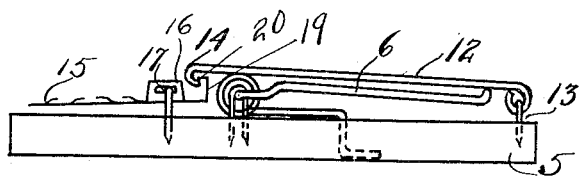
Fig. 1 is a side elevation of the trap when set.
Figure 2:
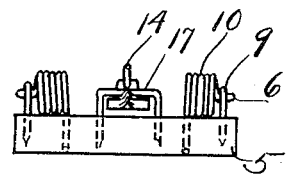
Fig. 2 is an end view of the same.
Figure 3:
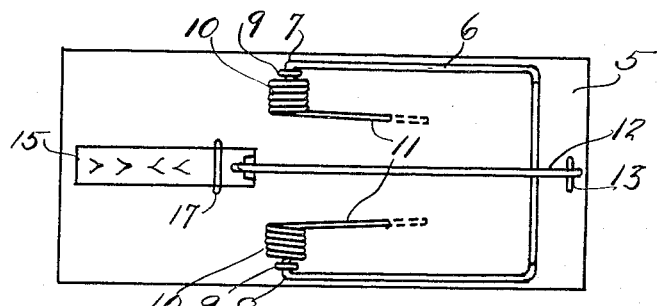
Fig. 3 is a plan view of the trap.

The features of my invention are embodied in a simple and economical design in which I use a base 5 which may be a piece of wood or the like. The jaw of the trap consists of a piece of spring wire formed to provide a U-shaped jaw proper 6. The ends 7 and 8 of the jaw 6 are bent inwardly to provide hinge points and are held down to the base 5 by means of staples 9, 9. Inwardly of the staples 9, 9 the wire is twisted to form two opposing helices 10, 10. These helices form coil springs which make movement of the jaw 6 of uniform tension throughout. The ends 11, 11 of the springs are extended along the upper surface of the base and then anchored to the latter in any desired manner.

The jaw 6 is held in set position in the customary manner by means of the retainer 12 which is in the form of a wire pivoted at 13 to the base 5. The free end of the retainer is bent back to form a hook 14.

The trip for the trap is formed as a lever 15. This may be of sheet metal, wood or the like and has an intermediate point formed with ears 16 through which the trip is pivoted to the base by means of the staple 17. One end of the trip has the bait-holder 18 by which food may be fastened to the trip.

On the opposite side of the trip beyond the staple 17 there is an extension in the form of a finger 19. This has a reversely turned hook 20 proportioned to engage the hook 14 of the retainer when the latter is in horizontal position.

The leverage of the trip 15 is such that when the bait-holder 18 is in its lowered position as shown in Fig. 1, the hook 19 fits over the hook 14 of the retainer and holds the latter against release.

Figure 4:
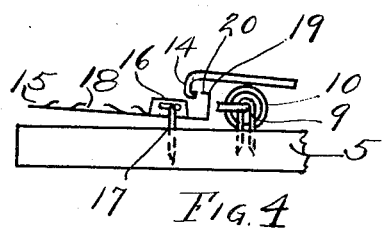
Fig. 4 is a fragmentary side elevation of the trap on being sprung.

To receive the mid-portion of the staple 17, the ears 16 are slotted as indicated in Figs. 1 and 4. This permits sliding movement of the member 15 horizontally of the base, either longitudinally or laterally. In this way, disengagement of the hook 14 may occur either when the lever 14 is tilted or when it is displaced horizontally. In the latter event the hook 20 moves back releasing hook 14, the retainer 12 remaining in its position either by reason of the form of its pivot or by the use of a stop pin on each side of the retainer.

Any downward movement of the bait-holder 15 serves only to increase the grip of the finger 19 on the retainer and thus accidental release of the jaw is prevented.

If, however, the bait-holder 15 is lifted, the finger 19 and hook 20 are retracted from the hook 14 and the retainer flies upward under the influence of the jaw 6. As soon as the jaw is released it flies over the strip and the end of the base.

In the operation of this trap it will be clearly apparent that the natural inclination of the rodent to lift the bait from the bolder is all that is needed to spring the trap. The effectiveness of the trap is, therefore, enhanced. A trap of this form is cheaply and ruggedly constructed. It may be given any desired size and strength so that the scope of the invention is to be considered as limited only by the terms of the following claims.

What I claim is:—

1. A trap comprising a base, a U-shaped wire jaw pivoted at its ends to the base, coil springs integral with the jaw and disposed inwardly from its pivotal points, the ends of the springs being anchored to the base, a retainer for the jaw, said retainer having a hooked end, a trip loosely mounted on the base for the pivotal movement in both vertical and horizontal planes and having a generally horizontal extension in the direction of the retainer, and a reversely directed hook on the extension engaging the hooked end of the retainer.

2. A trap comprising a base, a spring-held jaw on the base, a retainer for the jaw, a trip, a bait-holder at one end of the trip, a hooked extension at the other end of the trip, means pivoting said trip at an intermediate point thereof to the base, to permit the trip to have both vertical movement and horizontal sliding movement, the said trip being adapted for disengagement from the retainer when the bait-holder is raised.

3. A trap comprising a base, a spring held jaw on the base, a retainer for the jaw, a trip, a bait-holder at one end of said trip, a reversely turned hook on the other end of the trip for releasable engagement with the retainer, a pair of longitudinally slotted ears on an intermediate portion of the trip and fastening means on the base slidably engaged in said slots.

JOSEPH PAUL RICHARDSON.